United States Patent [19]
Arai et al.

[11] Patent Number: 5,841,901
[45] Date of Patent: Nov. 24, 1998

[54] PATTERN RECOGNITION SYSTEM

[75] Inventors: Toshifumi Arai, Hitachi; Hiroshi Shojima, Hitachiota; Masaki Miura; Yasushi Fukunaga, both of Hitachi, all of Japan

[73] Assignee: Hitachi, Ltd., Tokyo, Japan

[21] Appl. No.: 460,599

[22] Filed: Jun. 2, 1995

Related U.S. Application Data

[63] Continuation of Ser. No. 67,793, May 27, 1993, abandoned.

[30] Foreign Application Priority Data

May 27, 1992 [JP] Japan ................................. 4-135303

[51] Int. Cl.⁶ .................................................. G06K 9/70
[52] U.S. Cl. ........................... 382/187; 382/228; 382/309
[58] Field of Search ..................................... 382/187, 224, 382/226, 227, 309, 311, 209, 310, 228

[56] References Cited

U.S. PATENT DOCUMENTS

| | | | |
|---|---|---|---|
| 3,988,715 | 10/1976 | Mullan et al. | 382/228 |
| 4,944,022 | 7/1990 | Yasujima et al. | 382/14 |
| 4,958,375 | 9/1990 | Reilly et al. | 382/36 |
| 4,958,379 | 9/1990 | Yamaguchi et al. | 382/310 |
| 5,054,093 | 10/1991 | Cooper et al. | 382/36 |
| 5,191,622 | 3/1993 | Shojima et al. | 382/13 |
| 5,257,323 | 10/1993 | Melen et al. | 382/228 |
| 5,305,394 | 4/1994 | Tanaka | 382/13 |

FOREIGN PATENT DOCUMENTS

| | | | |
|---|---|---|---|
| 57-45680 | 3/1982 | Japan . | |
| 57-187780 | 11/1982 | Japan | G06K 9/02 |
| 58-223887 | 12/1983 | Japan . | |

Primary Examiner—Christopher S. Kelley
Attorney, Agent, or Firm—Antonelli, Terry, Stout & Kraus, LLP

[57] ABSTRACT

A pattern recognition system having a plurality of dictionaries, wherein handwritten input information is compared with patterns contained in the plurality of dictionaries so as to deliver a similar one of the patterns as a recognized result; The system comprises a controller which selects one pattern as a final recognized result from among recognized results based on the plurality of dictionaries, so as to deliver the selected pattern as its output. The controller evaluates summations of values previously set for respective candidate levels in the recognized results, for individual candidate patterns which exist in the recognized results based on the plurality of dictionaries, and it selects the pattern of the final recognized result on the basis of the summations. Thus, the recognized result most suited to a user is automatically derived from among the recognized results based on the plurality of dictionaries.

9 Claims, 8 Drawing Sheets

| 1 | 2 | 3 | 4 | 5 | 6 | 7 | |
|---|---|---|---|---|---|---|---|
| 犬 | モ | 歩 | ケ | ぽ | 棒 | F | |
| な | E | 昔 | け | ば | 検 | 上 | |
| 六 | も | 青 | サ | ゲ | 帽 | に | |
| 不 | ほ | 巻 | ツ | ぽ | 極 | 下 | |
| 天 | I | 芽 | 川 | ぜ | 椋 | じ | |

113

| 1 | 2 | 3 | 4 | 5 | 6 | 7 | |
|---|---|---|---|---|---|---|---|
| 犬 | も | 歩 | け | ぽ | 棒 | に | |
| 文 | ま | 芽 | ケ | ば | 帽 | 上 | |
| 不 | き | 表 | サ | げ | 棋 | 工 | |
| 方 | モ | 苦 | H | ぽ | 椋 | F | |
| 夫 | F | 奇 | は | ゲ | 検 | じ | |

114

| 1 | 2 | 3 | 4 | 5 | 6 | 7 | |
|---|---|---|---|---|---|---|---|
| 不 | も | 芽 | ケ | ば | 検 | F | |
| 元 | ほ | 歩 | け | ぽ | 椋 | に | |
| 犬 | E | 青 | サ | げ | 隔 | じ | |
| 天 | モ | 昔 | 川 | ぜ | 極 | 上 | |
| 六 | I | 奇 | ツ | ゲ | 棒 | 下 | |

| 1 | 2 | 3 | 4 | 5 | 6 | 7 | |
|---|---|---|---|---|---|---|---|
| 犬 | も | 歩 | け | ぼ | 棒 | に | |
| 不 | モ | 芽 | ケ | ば | 帽 | F | |
| 六 | E | 青 | サ | げ | 検 | 上 | |
| 天 | ほ | 昔 | ツ | ゲ | 椋 | じ | |
| 夫 | I | 奇 | 川 | ぽ | 極 | エ | |

| CANDIDATE LEVEL | 1 | 2 | 3 | 4 | 5 |
|---|---|---|---|---|---|
| RECOGNIZED RESULT | F | 土 | に | 下 | じ |

| CANDIDATE LEVEL | 1 | 2 | 3 | 4 | 5 |
|---|---|---|---|---|---|
| RECOGNIZED RESULT | に | 土 | エ | F | じ |

| CANDIDATE LEVEL | 1 | 2 | 3 | 4 | 5 |
|---|---|---|---|---|---|
| RECOGNIZED RESULT | F | に | じ | 土 | 下 |

PATTERN RECOGNITION SYSTEM

This application is a continuation application of U.S. Ser. No. 08/067,793, filed May 27, 1993 now abandoned.

BACKGROUND OF THE INVENTION

1. Field of the Invention

The present invention relates to a pattern recognition system utilizing pattern recognition technology, and more particularly to a system in which an optimum result is selected from among a plurality of recognized results.

By way of example only, the present invention is applied to a pattern recognition system in which an online pattern recognition technique is utilized for a user interface. Examples of online pattern recognition are handwritten character recognition and speech recognition. The pattern recognition systems include, for example, document processing systems which are employed in offices, and slip fill-up systems which are employed in banks and department stores.

2. Description of the Related Art

As regards prior-art information processing systems utilizing pattern recognition, there are a method as disclosed in the official gazette of Japanese Patent Application Laid-open No. 223887/1983 wherein, before the use of the system, a suitable one of existing dictionaries is picked out, and a user dictionary is created on the basis of the picked-out dictionary, and a method as disclosed in the official gazette of Japanese Patent Application Laid-open No. 45680/1982 wherein, during the operation of the system, a dictionary has new patterns supplemented thereto and is thus customized for a user. Also known as a method which is customized for a user is one wherein a personal dictionary for recognizing patterns peculiar to the user is installed in addition to a standard dictionary for recognizing standard patterns.

The first-mentioned prior-art technique, however, has the problem that means for automatically estimating the degrees of the fitting of the individual dictionaries to the user is not offered, so the user must find dictionary which is particularly suitable, through trial and error. Such trial and error is next to impossible in a system which is used by many unspecified users. Even in an environment where the system is used by specified users, a heavy burden is imposed on each user.

Further, the second-mentioned method wherein the dictionary is made suitable for the user by automatically registering the new patterns in the active dictionary has the problem of being incapable of coping with a situation where the system has been used by many unspecified users. Since the pattern registered by a certain one of the users is not always a standard pattern, it sometimes forms the cause of misrecognition or erroneous recognition for another of the users. Moreover, the existence of patterns of close resemblance within the single dictionary causes misrecognition and has the reverse effect of lowering the rate of correct recognition. Accordingly, the patterns to be newly registered in the dictionary must have some "distances" from existing patterns, so that the patterns which can be registered in the single dictionary have limitations. For the above reasons, learning based on rewriting the contents of the dictionary is unsuited to a system which is used by many unspecified users.

Regarding the third-mentioned method, the user can tentatively create a personal dictionary customized for himself/ herself. However, in a case where the patterns to be registered are large in number, a heavy burden is imposed on the user. For example, in the case of handwritten character recognition, the patterns to-be-recognized including "kanjis" (Chinese characters used in Japanese writing) are as large in number as several thousand, and hence, it is next to impossible for the user to register all the patterns. As another problem, since the personal dictionaries need to be prepared in accordance with the individual users beforehand, this technique is unsuited to a system which is used by many unspecified users.

SUMMARY OF THE INVENTION

An object of the present invention is to provide a pattern recognition system which can be automatically fitted to a large number of multifarious users.

The first feature of the present invention consists in a pattern recognition system having a plurality of dictionaries, and recognition means for comparing handwritten input information with patterns contained in the plurality of dictionaries so as to recognize the most similar pattern; comprising storage means for holding therein recognized results, based on the plurality of dictionaries, for the respective dictionaries; and control means for selecting one pattern as a final recognized result from among the recognized results held in the storage means, in accordance with candidate levels of respective candidate patterns in the recognized results, so as to display the selected pattern.

Thus, the recognized result which is most suited to a user is derived from among the recognized results based on the plurality of dictionaries. It is therefore possible to realize a pattern recognition system which can be automatically customized for the user.

The second feature of the present invention consists in a pattern recognition system having first storage means for storing therein a plurality of combinations of programs and dictionaries for use in pattern recognition; comprising second storage means for storing recognized results therein; degree-of-fitting calculation means for calculating degrees of fitting to correct answers in the respective combinations on the basis of the stored recognized results; input means for accepting information being a subject for the pattern recognition; recognition means for obtaining the recognized results for the accepted information in the respective combinations by the use of the programs and the dictionaries; and control means for selecting at least one result from among the recognized results obtained in the combinations of the programs and the dictionaries on the basis of the calculated degrees of fitting.

Thus, in an environment where a plurality of combinations of algorithms and dictionaries for use in online pattern recognition can be used, the degrees of fitting to users in the respective combinations can be automatically calculated, and the certainties of the recognized results can be estimated on the basis of the calculated degrees of fitting. It is therefore possible to realize an online pattern recognition technique which can be automatically customized for the multifarious users.

DETAILED DESCRIPTION OF THE PREFERRED EMBODIMENTS

Figure 1:
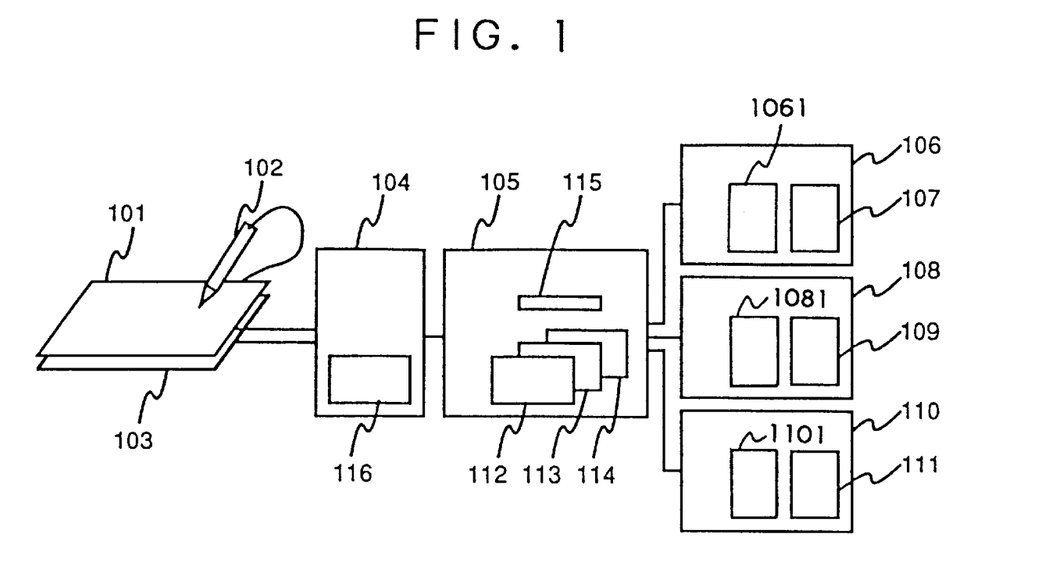
FIG. 1 is a block diagram of a document processing system employing handwritten character recognition in an embodiment of the present invention.

Now, an embodiment of the present invention will be described with reference to FIG. 1. This figure is a block diagram of a document processing system which utilizes online handwritten character recognition. The document processing system comprises a coordinate reader (for example, an electromagnetic tablet) 101, a stylus or pen 102 for inputting coordinate values, a display unit (for example, a liquid-crystal display unit) 103, an information processor 104, a handwritten character recognition controller (serving also as degree-of-fitting calculation means) 105, and handwritten character recognizers (as first storage means and recognizers) 106, 108 and 110 which include programs 1061, 1081 and 1101 and dictionaries 107, 109 and 111. The other parts depicted in FIG. 1 will be explained later.

The user of the information processing system can enter a coordinate string into the system with the coordinate reader 101 and the coordinate entering stylus 102 which constitute input means. The coordinate string is input continually while the tip of the stylus 102 is in touch with the front surface of the coordinate reader 101. The coordinate reader 101 is transparent, and it is mounted in superposition on the front surface of the display unit 103. Further, it is assumed in this embodiment that the coordinate systems of both the elements 101 and 103 are in agreement. Thus, the user can enter the coordinate string with the stylus 102 while watching a content displayed on the display unit 103.

The entered coordinate string is immediately sent to the information processor 104. The information processor 104 executes predetermined processes in accordance with particular situations. In a situation where the user enters line drawing information, the information processor 104 connects the points of input coordinates with successive segments. Since the coordinate system of the coordinate input device 101, 102 is in agreement with that of the display unit 103, the drawn segments look to the user like handwriting performed with the stylus 102. Thus, the user can obtain the same operating feeling as in the case of drawing lines on a sheet of paper with a pencil. Besides, in a case where a menu or the like is displayed at the position of an input coordinate, the information processor 104 executes processes such as the inverted display of a menu item and a function allotted to the item.

Figure 2:
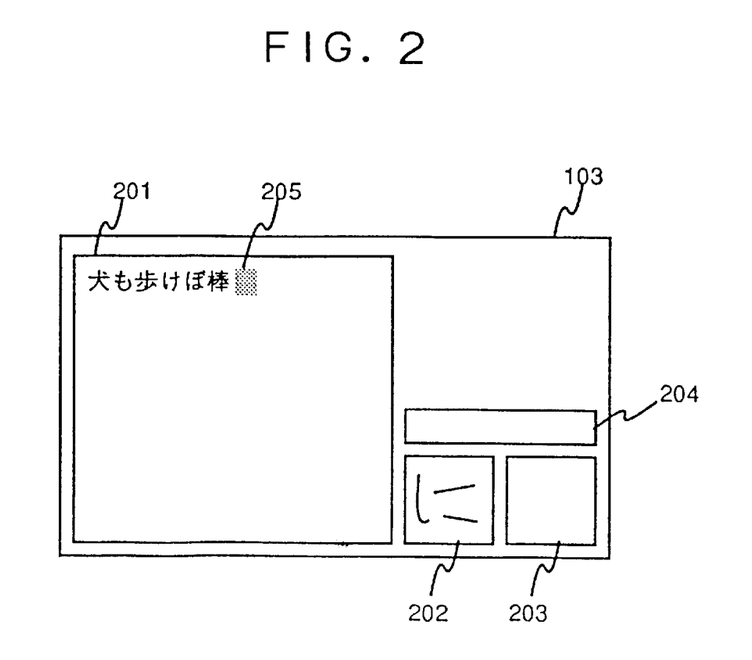
FIG. 2 is a front view for explaining the screen of the document processing system.

FIG. 2 illustrates the operating screen of the document processing system of this embodiment. The screen is displayed on the display unit 103 by the information processor 104, and the user enters or edits sentences with the stylus 102. A document display area 201 is a part corresponding to the screen of a word processor, and is an area for displaying input characters as well as recognized results for the input characters. In the state of FIG. 2, a document that has been read as "犬も歩けば棒" is displayed. A cursor 205 indicates a position into which the next character is to be inserted.

Character input areas 202 and 203 are areas for entering handwritten characters, and the user writes the characters therein with the stylus 102. Upon judging that an input is directed to the character input area 202 or 203, the information processor 104 draws the traces of the tip of the stylus 102 and also records an input coordinate string. The completion of the character can be detected on the basis of the fact that a predetermined time period (for example, 2 seconds) has lapsed since the user's interruption of the input to the character input area 202 or 203, or that the input operation has shifted to the other character input area or to any part different from the character input areas. Incidentally, although the two character input areas 202 and 203 are exemplified in this embodiment, a single character input area or at least three character input areas may well be provided.

In the state of FIG. 2, the user has handwritten hiragana (Japanese cursive syllabic character) "に" in the character input area 202. Upon detecting that the user's character input operation has been completed, the information processor 104 affixes an identification No. indicating the No. of the pertinent recognizing operation, to the input coordinate string recorded beforehand and then sends the resulting coordinate string to the handwritten character recognition controller 105.

A plurality of handwritten character recognizers, the algorithms (programs) or dictionaries of which are different, are connected to the handwritten character recognition controller 105. In this embodiment, the three handwritten character recognizers 106, 108 and 110 are connected and used. The handwritten character recognition controller 105 normalizes the input coordinate string received from the information processor 104, in order that the handwritten character recognizers 106, 108 and 110 may accept the input coordinate string. Subsequently, the controller 105 sends the normalized coordinate strings to the respective recognizers 106, 108 and 110. The normalization is a process for converting the coordinate string into a representation which each handwritten character recognizer can accept. By way of example, the senses of a coordinate system, the size of the character, and methods of representing the start and end of one stroke are converted so that each handwritten character recognizer can accept the character string. The normalized data are sent to the respective handwritten character recognizers 106, 108 and 110.

Here, the contents of the recognition process will be explained as to the case of the handwritten character recognizer 106.

The handwritten character recognizer 106 has the dictionary 107 for recognizing handwritten characters. The dictionary 107 contains pairs of character codes and character patterns put together. An example of the character pattern is such that the vector information of a line constituting a character is simplified in any form. Here, it is assumed that the line is expressed by only the coordinates of the tail and head of each vector. The data sent from the handwritten character recognition controller 105 are handled in conformity with the data representation by the handwritten character recognizer 106.

The handwritten character recognizer 106 collates the input data with the patterns in the dictionary 107, to thereby estimate a character whose pattern is close to the input data. A method for the collation consists of computing the geometrical distances between the input data and the data in the dictionary 107, and determining the character of the smallest distance value as a recognized result. Such a geometrical distance shall be simply called the "distance" hereinbelow. On account of ambiguity involved in the handwritten character, a plurality of character codes are sometimes obtained as results. It can be surmised that the obtained results will be more correct in the order of shorter distances.

A variety of algorithms for the collation have been contrived on the basis of differences in a method of limiting a collating range, a method of processing the running hand, a method of processing the wrong order of making strokes in writing a character, feature values contained in character patterns in a dictionary, and so forth. Also the handwritten character recognizers 108 and 110 produce recognized results which might differ from each other, in accordance with the respective algorithms (programs 1081, 1101) and dictionaries 109, 111.

Each of the handwritten character recognizers 106, 108 and 110 arrays the obtained results in the order in which they seem to be more correct answers. It sends the arrayed results back to the handwritten character recognition controller 105.

Figure 3:
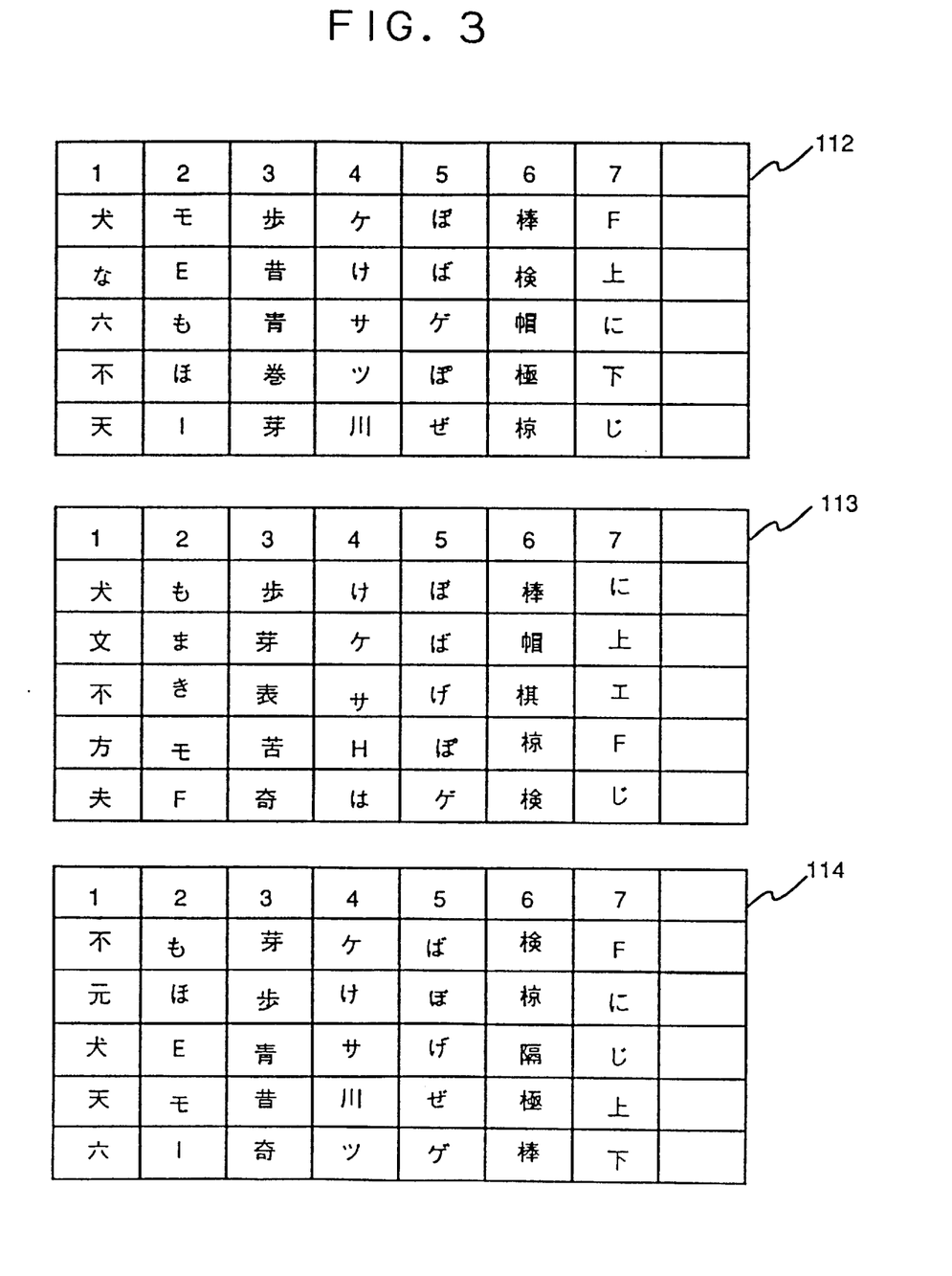
FIG. 3 is a diagram for explaining individual-recognizer result tables in which recognized results delivered from individual handwritten character recognizers are respectively stored.

The strings of the characters of the recognized results delivered from the handwritten character recognizers 106, 108 and 110 are respectively stored in individual-recognizer result tables 112, 113 and 114 which are included in the handwritten character recognition controller 105. The individual-recognizer result table 112 is an area for storing the recognized results of the handwritten character recognizer 106 therein. Likewise, the individual-recognizer result table 113 is an area for storing the results of the handwritten character recognizer 108 therein, while the individual-recognizer result table 114 is an area for storing the results of the handwritten character recognizer 110 therein. FIG. 3 illustrates examples of the contents of the individual-recognizer result tables 112, 113 and 114. The first row of each of the individual-recognizer result tables 112, 113 and 114 indicates the identification Nos. which signify the Nos. of the recognizing operations. Each of the identification Nos. has been sent together with the data to-be-recognized by the information processor 104. The second row, et seq. of each of the tables 112, 113 and 114 indicate the strings of the characters sent from the corresponding handwritten character recognizer as arrayed in the order in which the character strings seem to be more certain.

When the recognized results of all the handwritten character recognizers 106, 108 and 110 have become complete, the handwritten character recognition controller 105 must pick out the results which seem to be the most correct, from among the plurality of results which might exist, so as to send the picked-out results back to the information processor 104. In order to meet this requisite, the handwritten character recognition controller 105 first computes the degrees of fitting of the respective handwritten character recognizers 106, 108 and 110 to the user by a method as explained below.

Figure 4:
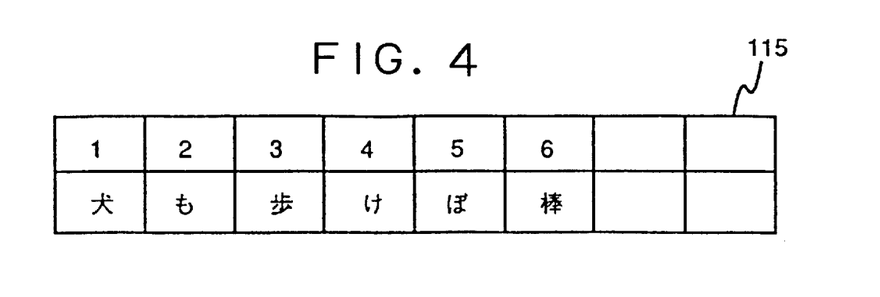
FIG. 4 is a diagram for explaining a correct answer table in which the correct answers of recognition are recorded.

The correct answers of the recognizing operations performed before are recorded in a correct answer table 115 which is included in the handwritten character recognition controller 105. Incidentally, the initial state of the correct answer table 115 will be explained later. FIG. 4 illustrates an example of the content of the correct answer table 115. Likewise to the first row of each of the individual-recognizer result tables 112, 113 and 114, the first row of the correct answer table 115 indicates identification Nos. which signify the Nos. of the recognized results. The second row of the table 115 indicates characters which are the correct answers. The characters which have been estimated by the handwritten character recognition controller 105 to be the most certain, are first entered into the columns of the correct answers in the correct answer table 115. Accordingly, any character which is not a truly desired character can be kept stored until the result of the user's operation of correcting misrecognition or erroneous recognition is reflected. Since the user often corrects the misrecognition after having written several characters collectively, those newly recorded among the results recorded in the correct answer table 115 have a high possibility of involving errors.

In view of the correct answer table 115 and the individual-recognizer result tables 112, 113 and 114, the handwritten character recognition controller 105 can know the candidate Nos. of the correct answers of the results produced by each of the handwritten character recognizers 106, 108 and 110. On the basis of the candidate No. information, the degrees of fitting of the respective handwritten character recognizers 106, 108 and 110 to the user are computed. A method of calculating the degree of fitting will be exemplified below.

First, the controller 105 gives degree of correctness values to the individual recognized results as follows by way of example: a value of 1 (one) is given to the correct answer of the first candidate (candidate No. 1 in the uppermost character string at the second row of each of the tables 112, 113 and 114), 0.8 to that of the second candidate (No. 2 at the third row), 0.5 to that of the third candidate (No. 3 at the fourth row), and 0.2 k to that of any of succeeding candidates (No. 4 at the fifth row, et seq.). Besides, 0-(zero) is given to any recognized result which has failed to become a candidate. Subsequently, the total of the values of the recognized results of each recognizer 106, 108 or 110 is divided by the number of times which the recognized results have been obtained. A value of 0 thru 1 inclusive thus calculated is defined as the degree of fitting of each of the handwritten character recognizers 106, 108 and 110 to the user. Since, however, the characters recently recorded in the correct answer table 115 might not be the truly desired characters as has already been stated, the most recent one or more results are excluded from being subjects for the above computation.

By way of example, let's consider a case where the correct answer table 115 has the content shown in FIG. 4, while the individual-recognizer result tables 112, 113 and 114 have the contents shown in FIG. 3. Each of the individual-recognizer result tables 112, 113 and 114 bears the information on the seven most recent recognizing operations. Since, however, errors might be contained in the correct answer table 115 for the most recent results, the two newest results or the two results of the largest identification Nos. (namely, "ほ" and "棒") among the recognized results recorded in the correct answer table 115 are excluded from being subjects for the computation of the degree of fitting.

That is, the results having the recognition identification Nos. 1 thru 4 are the subjects for the computation of the degree of fitting. Regarding the handwritten character recognizer 106, the correct answer "犬" for the identification No. 1 (in FIG. 4) corresponds to the first candidate (the first or uppermost character string at the second row of the table 112 in FIG. 3), so that a value of 1 (one) is given to the result of this recognizer 106 having the identification No. 1. Likewise, a value of 0.5 is given to the result of the identification No. 2 because the corresponding correct answer "も" is contained in the character string of the third candidate, a value of 1 (one) is given to the result of the identification No. 3 because the corresponding correct answer "歩" is contained in the character string of the first candidate, and a value of 0.8 is given to the result of the identification No. 4 because the corresponding correct answer "け" is contained in the character string of the second candidate. Thus, the values of the recognized results of the recognizer 106 total 3.3. Subsequently, the total is divided by 4 which is the number of times of the recognizing operations, to obtain a value of 0.825 as the degree of fitting of the recognizer 106 to the user. The degrees of fitting of the handwritten character recognizers 108 and 110 are similarly computed as 1 (one) and 0.775, respectively.

After having evaluated the degrees of fitting of the respective handwritten character recognizers 106, 108 and 110 to the user, the handwritten character recognition controller 105 estimates the character which seems to be the most correct of the recognized results, on the basis of the evaluated degrees of fitting and by virtue of a method as explained below.

First, the controller 105 gives values to the individual recognized results delivered from the handwritten character recognizers 106, 108 and 110. Letting Rn denote the degree of fitting of any of the handwritten character recognizers to the user, the degree of correctness value of the ith candidate derived from the pertinent recognizer is represented by Rn×P(i). Here, letter P denotes a function for giving the values in accordance with the levels of the candidates. The function takes a value of 1 (one) for the first candidate (of i=1, corresponding to the uppermost character string at the second row of each of the tables 112, 113 and 114 in FIG. 3), a value of 0.8 for the second candidate (of i=2, corresponding to the character string at the third row), a value of 0.5 for the third candidate (of i=3, corresponding to the character string at the fourth row), and a value of 0.2 for the other candidates (of i>3, corresponding to the character strings at the fifth row, et seq.). Subsequently, in a case where the results produced by the handwritten character recognizers 106, 108 and 110 include ones of the same character(s), the values computed above are totaled for the same character(s). Lastly, the characters of the results are arrayed in the order of greater values, and the arrayal is set as the order in which the results seem to be more certain.

The handwritten character recognition controller 105 adopts the character of the largest value thus obtained, as the recognized result which seems to be the most correct. On this occasion, the controller 105 newly records the recognized result in the correct answer table 115.

Figure 5:
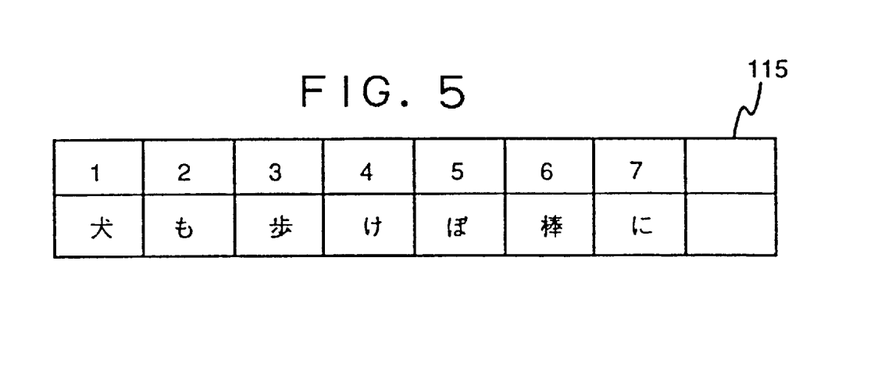
FIG. 5 is a diagram for explaining the content of the correct answer table into which the content shown in FIG. 4 has been updated.

By way of example, the correct answer in the recognizing operation of identification No. 7 will be estimated for the case where the correct answer table 115 has the content shown in FIG. 4, while the individual-recognizer result tables 112, 113 and 114 have the contents shown in FIG. 3. Since the degree of fitting of the handwritten character recognizer 106 to the user is 0.825, the values of the results produced by this recognizer 106 are 0.825 for the first candidate, 0.66 for the second candidate, 0.4125 for the third candidate, 0.165 for fourth candidate, and 0.165 for the fifth candidate. Besides, since the degree of fitting of the handwritten character recognizer 108 is 1 (one), the values of the results produced by this recognizer 108 are 1 (one), 0.8, 0.5, 0.2, and 0.2 in the order from the first candidate to the fifth candidate, respectively. Further, since the degree of fitting of the handwritten character recognizer 110 is 0.775, the values of the results produced by this recognizer 110 are 0.775, 0.62, 0.3875, 0.115, and 0.115 in the order from the first candidate to the fifth candidate, respectively. On the basis of these values of the candidates, the total values of individual characters in the dictionaries are computed by the use of the character codes. Then, "に" (Japanese cursive syllabic character) has a total of 2.0325, letter "F" has a total of 1.8, "上" (Chinese character used in Japanese writing) has a total of 1.575, "せ" (Japanese cursive syllabic character) has a total of 0.7525, "エ" (Japanese square syllabic character) has a total of 0.5, and "下" (Chinese character used in Japanese writing) has a total of 0.28. In this case, accordingly, the handwritten character recognition controller 105 can estimate that the character "に" will be the most correct. Also, it records the obtained result in the column of the identification No. 7 in the correct answer table 115. Thus, the content of the table 115 is updated as shown in FIG. 5.

The handwritten character recognition controller 105 sends several characters of greater values (i.e., more correct results) among the obtained results to the information processor 104.

Here, the flow of the processing from the calculation of the degrees of fitting to the sending of the estimated correct answer to the information processor 104 will be summed up.

The flow of the processing proceeds in conformity with the following steps:

Step 1; Computing the degrees of fitting of the respective handwritten character recognizers to the user.

Step 2; Computing the totals of the values as to the individual characters by the use of the values which are set for the respective candidate levels in the recognized results.

Step 3; Aligning or arraying the characters in the order in which the totals of the values as computed for the recognized results at the step 2 are greater.

Step 4; Storing the character of the greatest total values in the alignment formed at the step 3, in the correct answer table 115.

Step 5; Sending several characters of the greater total values in the alignment formed at the step 3, to the information processor 104.

The above steps 1 and 2 will be further explained below.

At the step 1, in a case where N which denotes the number of the correct answers stored in the correct answer table 115 is 5 or smaller, the flow returns with the degrees of fitting of all the handwritten character recognizers set at 1 (one). This process is intended to find the correct answers by using the values themselves set for the respective candidate levels under the condition that the degrees of fitting of all the recognizers are 1 (one), when the sufficient number of correct answers are not yet stored in the correct answer table 115, for example, when the information processing system is in the initial state. On the other hand, in a case where the number N is larger than 5, a process to be stated below is executed as to each of the handwritten character recognizers. First, 0 (zero) is substituted into a variable T which is used for the computation of the degree of fitting. Subsequently, a range in which the Nos. j in the correct answer table 115 are from 1 (one) thru (N−2) inclusive is handled as stated below (such a limited range is intended to exclude the two most recent results from the computation of the degree of fitting). 1 (One) is added to the variable T when the character at the jth item of the correct answer table 115 is the first candidate (first candidate pattern) at the jth item of the individual-recognizer result table. Likewise, 0.8 is added to the variable T for the second candidate (second candidate pattern), 0.5 is added thereto for the third candidate (third candidate pattern), and 0.2 is added thereto for the fourth candidate (fourth candidate pattern) et seq. Finally, T/(N−2) is computed as the degree of fitting of the handwritten character recognizer to the user.

At the step 2, a process to be stated below is executed for each of the handwritten character recognizers. The value of the jth candidate delivered from the handwritten character recognizer is calculated in conformity with Rn×P(i). In this formula, Rn denotes the degree of fitting of the handwritten character recognizer (as evaluated at the step 1), and P(i) denotes the function which gives the appropriate numerical value in accordance with the value i. i=1 represents the first candidate (candidate Level-1). The numerical values given by the function P(i) are P(i)=1.0 for i=1, P(i)=0.8 for i=2, P(i)=0.5 for i=3, and P(i)=0.2 for i>3. The recognized results delivered from all the handwritten character recognizers are put together, and the values of the characters of the same character codes are totaled. Thus, the values of the respective characters in the recognized results are obtained.

The sizes (namely, the numbers of columns) of the correct answer table 115 and the individual-recognizer result tables 112, 113 and 114 are, of course, definite. Therefore, when the columns have been filled up, the results in the oldest columns are discarded, and the new results are stored therein. This measure brings forth the effect that the old recognized results do not reflect on the computations of the degrees of fitting of the handwritten character recognizers because they are discarded. This feature is advantageous in view of the theory that characters which people write change with the passage of time. Moreover, in an environment where many and unspecified users use the information processing system, the system must be promptly adapted to the new user when the users have changed. In such a case, the degrees of fitting of the handwritten character recognizers may be computed on the basis of the comparatively new recognized results.

Figure 6:
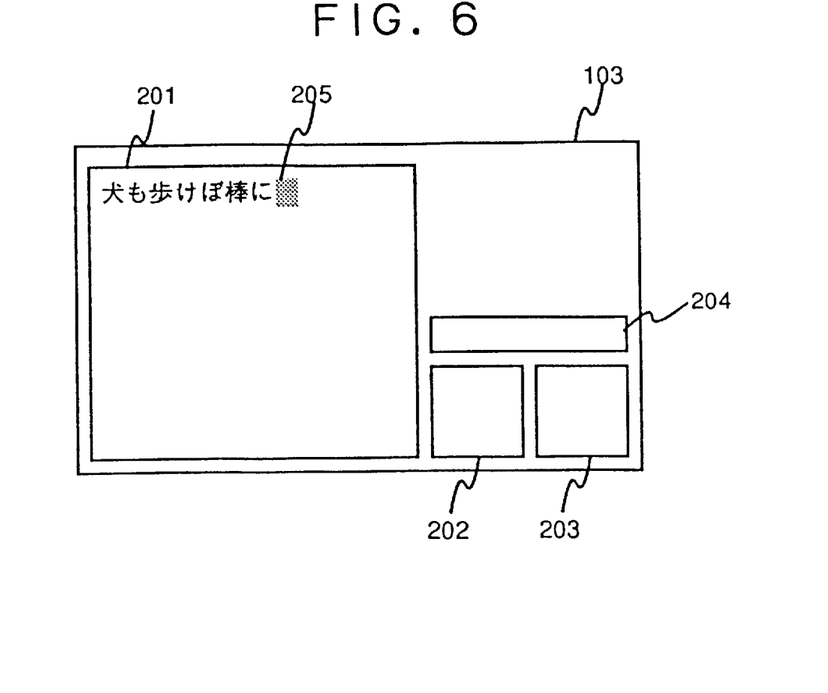
FIG. 6 is a diagram for explaining how the display of the screen shown in FIG. 2 has been updated.
Figure 7:
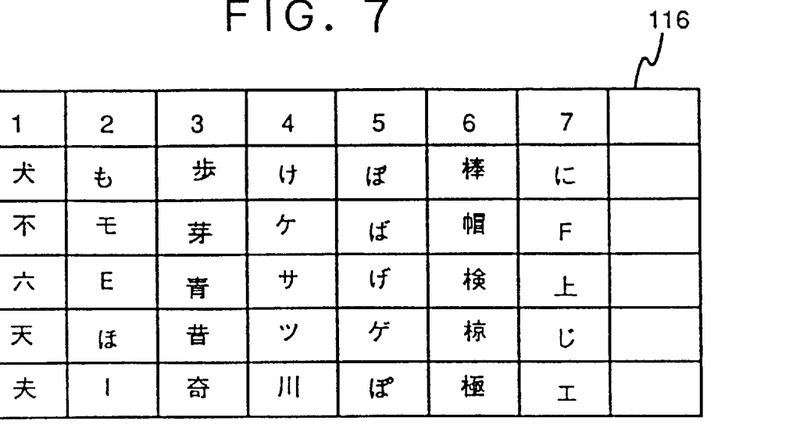
FIG. 7 is a diagram for explaining a table in which recognized results are recorded.

Meanwhile, the information processor 104 operates to display the character which seems to be the most certain in the results sent from the handwritten character recognition controller 105, in the document display area 201 of the display unit 103. In the example mentioned above, the character " に " seems to be the most certain, and hence, the content of the document display area 201 is updated as shown in FIG. 6. Besides, the information processor 104 records the results in a result table 116. The recorded results are used in the later operation of correcting the misrecognition. An example of the content of the result table 116 is shown in FIG. 7. The form of this table is the same as that of the individual-recognizer result table 112, 113 or 114.

Figure 8:
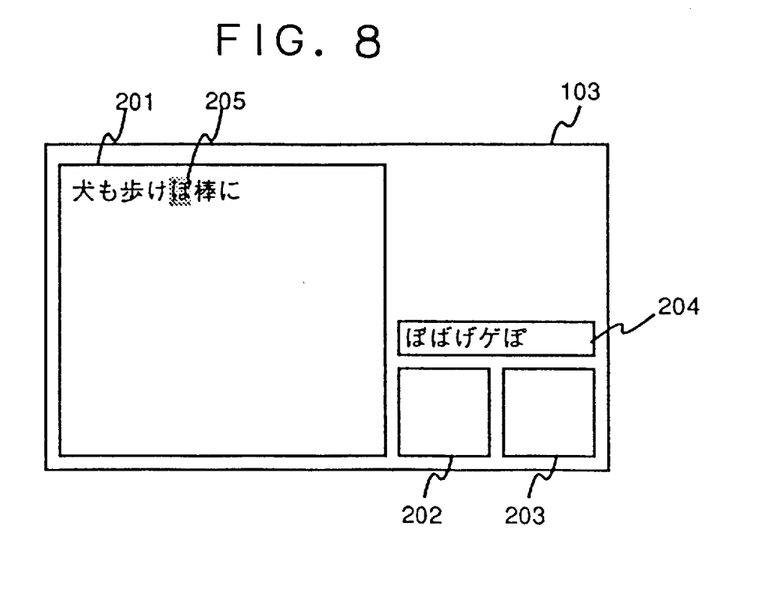
FIG. 8 is a diagram for explaining how the display of the screen display shown in FIG. 6 has been updated.

When some input operations have been done, the display of the screen of the display unit 103 will be as shown in FIG. 6 by way of example. In this regard, the displayed document is sometimes different from a document intended by the user, on account of the ambiguity of a handwritten character. In the illustration of FIG. 6, although the user has intended to enter a document " 犬も歩けば棒に ", the document " 犬も歩けば棒に " is displayed on the screen. In order to correct the error, the user points to the misrecognized character " ぼ " (Japanese cursive syllabic character) with the stylus 102. The information processor 104 finds that the user has pointed to the character already displayed. Therefore, it operates to display the results obtained in the recognizing operations in the candidate character display area 204 of the display unit 103 in order that the user may be permitted to correct the misrecognition. In the above example, the result table 116 has the content as shown in FIG. 7, so that candidates for the correction are " ぼ ", " ば ", " げ ", " ゲ " and " ぽ ". Accordingly, the screen comes to display a content as shown in FIG. 8. If the intended character is included in the display of the candidate character display area 204, the user can correct the misrecognized character in the document display area 201 by pointing to it with the stylus 102. Since, in this case, the intended character " ば " is included as the second candidate, the user can correct the misrecognition by pointing to it with the stylus 102.

Figure 9:
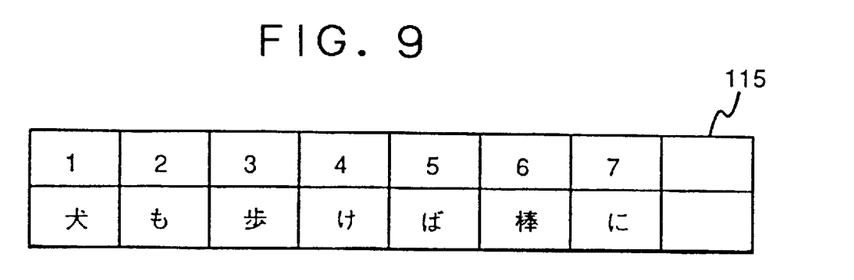
FIG. 9 is a diagram for explaining how the content of the correct answer table shown in FIG. 5 has been updated by the correction of misrecognition.

Owing to the user's correcting operation, the information processor 104 can know the identification No. of the recognition which was erroneous, and the correct answer corresponding thereto. The identification No. and the correct answer which have been found here, are sent to the handwritten character recognition controller 105. Then, the handwritten character recognition controller 105 reflects the sent results on the correct answer table 115. In the above example, the identification No. is "5", and the corrected result is " ば ". Therefore, the handwritten character recognition controller 105 amends the content of the correct answer table 115 as shown in FIG. 9. In this embodiment, the degrees of fitting of the respective handwritten character recognizers to the user are newly computed each time one character is entered. Accordingly, the content of the correct answer table 115 updated here is reflected on the computations of the degrees of fitting in the subsequent operations of entering characters. That is, according to the pattern recognition method of this embodiment, the degrees of fitting of the respective handwritten character recognizers to the user are changed by the result of the user's correction of the misrecognition, whereby the estimation of the correct answer can be rendered more reliable.

In this embodiment, each of the handwritten character recognizers has only one dictionary. In actual fact, even when the identical algorithm of handwritten character recognition is employed, the rate of correct recognition often differs conspicuously on account of different dictionaries. Accordingly, a document processing system can also be so constructed that each handwritten character recognizer has a plurality of dictionaries. In such a case, it may be considered that imaginary or virtual handwritten character recognizers exist in accordance with the number of the dictionaries in spite of the use of an identical algorithm.

Besides, the computations of the degrees of fitting to the user as explained above need not always be performed in the handwritten character recognition controller 105. In such a case where a certain handwritten character recognizer has a plurality of algorithms or dictionaries, the handwritten character recognition controller 105 reports the situation of the user's correction of misrecognition to the handwritten character recognizer, whereupon the combinations between the algorithms and the dictionaries may be estimated within the handwritten character recognizer.

In this embodiment, the user's correcting operation is employed as a method of finding out misrecognition.

However, when a character string to be entered can be predicted as in the case of the name of a place, the misrecognition can be sometimes found out, depending upon whether or not the entered character string is contained in the set of presumed character strings. Alternatively, the misrecognition can be sometimes found out by a language processing technique such as syntax analysis.

As stated before, in this embodiment, the degree of fitting of each of the handwritten character recognizers to the user is calculated for every recognizing operation. In this regard, it is also considered to employ a method in which the degree of fitting is fixed when a suitable number of recognizing operations have ended. With this method, the rate of correct recognition might lower when the users have changed. Such a drawback, however, can be eliminated by computing the degree of fitting again at the point of time at which the correct recognition rate has become lower than a certain value.

Although, in this embodiment, the plurality of handwritten character recognizers are all used continually, a method in which only the handwritten character recognizer exhibiting a high degree of fitting to the user is used is also considered. Also in this case, the correct recognition rate might lower when the users have changed. The drawback, however, can be eliminated by computing the degrees of fitting of the plurality of handwritten character recognizers again at the point of time at which the correct recognition rate of the pertinent recognizer has become lower than a certain value.

Besides, it is possible to take a measure in which, when the use of the document processing system has ended, the degrees of fitting are stored in a nonvolatile memory, and in which, when the system has been subsequently started up, the stored degrees of fitting are set as initial values. This measure brings forth the merit that, when the same person uses the system, the system is well fitted to the user from the beginning.

By the way, the information processor 104, the handwritten character recognizers 106, 108 and 110, etc. may well be realized in the form of software components. In this case, the software components may be run in an identical computer or may well be run in separate computers. In the case where they are run in separate computers, the processes are simultaneously executed in a distributed manner as the whole system, and hence, the responsibility of the system to the user can be enhanced.

Further, although this embodiment has been described as to the case of applying the present invention to online handwritten character recognition, the invention is also applicable to online pattern recognition, online symbol recognition, online speech recognition, etc.

In the online speech recognition, by way of example, the degrees of fitting may be computed by the same method as stated above, in such a way that speech dictionaries are prepared for individual generations or for individual sexes beforehand, while a plurality of algorithms for speech recognition are also prepared beforehand, and that speech recognition results obtained in the respective combinations between the dictionaries and the algorithms are used for the computations.

In the foregoing embodiment, the degrees of fitting of the respective handwritten character recognizers to the user are evaluated. As an alternative measure, a correct answer may well be estimated using only values which are set for respective candidate levels in recognized results based on the handwritten character recognizers, without evaluating the degrees of fitting to the user.

Now, reference will be made to FIG. 10 to describe an embodiment in which one recognized result is selected from among recognized results based on a plurality of dictionaries, in consideration of candidate levels in the recognized results. According to this embodiment, it is possible to offer a document processing system in which handwritten characters can be recognized with the candidate levels taken into account, unlike the conventional handwritten character recognition based on only distance values.

Figure 10:
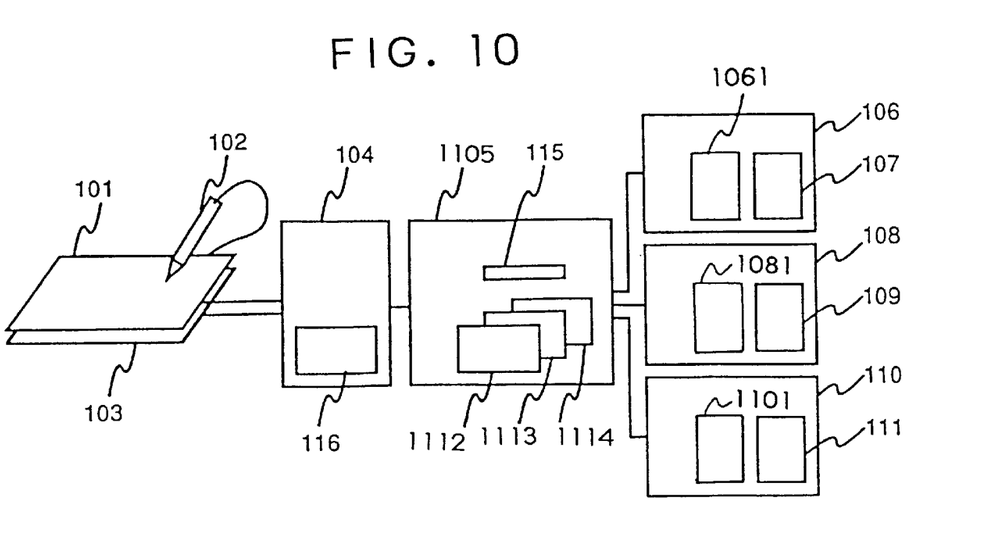
FIG. 10 is a block diagram showing another embodiment of a document processing system in which one of recognized results is selected in accordance with candidate levels.

FIG. 10 is a block diagram of the document processing system which utilizes the online handwritten character recognition. This document processing system comprises a coordinate reader 101, a stylus 102 for inputting coordinate values, a display unit 103, an information processor 104, a handwritten character recognition controller 1105, and handwritten character recognizers 106, 108 and 110 which include programs 1061, 1081 and 1101 and dictionaries 107, 109 and 111.

The user of the information processing system can enter a coordinate string into the system with the coordinate reader 101 and the coordinate entering stylus 102. They can enter the coordinate string with the stylus 102 while watching a content displayed on the display unit 103.

The entered coordinate string is immediately sent to the information processor 104. The information processor 104 executes predetermined processes in accordance with particular situations. In a situation where the user enters line drawing information, the information processor 104 successively connects the points of input coordinates with segments.

Also in this embodiment, the operating screen of the document processing system is assumed to be as shown in FIG. 2. A document reading, such as "犬も歩けば棒" is displayed. A cursor 205 indicates a position into which the next character is to be inserted.

Character input areas 202 and 203 are areas for entering handwritten characters, and the user writes the characters therein with the stylus 102.

In the state of FIG. 2, the user has handwritten hiragana (Japanese cursive syllabic character) "に" in the character input area 202. Upon detecting that the user's character input operation has been completed, the information processor 104 sends the input coordinate string recorded beforehand, to the handwritten character recognition controller 1105.

A plurality of handwritten character recognizers, the algorithms (programs) or dictionaries of which are different, are connected to the handwritten character recognition controller 1105. In this embodiment, the three handwritten character recognizers 106, 108 and 110 are connected. The handwritten character recognition controller 1105 normalizes the input coordinate string received from the information processor 104, in order that the handwritten character recognizers 106, 108 and 110 may accept the input coordinate string. Subsequently, the controller 1105 sends the normalized coordinate strings to the respective recognizers 106, 108 and 110. The normalized data are sent to the respective handwritten character recognizers 106, 108 and 110.

Here, the contents of the recognition process will be explained for the case of the handwritten character recognizer 106.

The handwritten character recognizer 106 has the dictionary 107 for recognizing handwritten characters. The dictionary 107 contains pairs of character codes and character patterns put together.

The handwritten character recognizer 106 collates the input data with the patterns in the dictionary 107, to thereby estimate a character whose pattern is close to the input data. A method for the collation consists in computing the geometrical distances between the input data and the data in the dictionary 107, and determining the character of the smallest distance value as a recognized result. Such a geometrical distance shall be simply called the "distance" hereinbelow. On account of ambiguity involved in the handwritten character, a plurality of character codes are sometimes obtained as results. It can be surmised that the obtained results will be more correct in the order of shorter distances.

A variety of algorithms for the collation have been contrived on the basis of differences in a method of limiting a collating range, a method of processing the running hand, a method of processing the wrong order of making strokes in writing a character, feature values contained in character patterns in a dictionary, and so forth. Also the handwritten character recognizers 108 and 110 produce recognized results which might differ from each other, in accordance with the respective algorithms (programs 1081, 1101) and dictionaries 109, 111.

Each of the handwritten character recognizers 106, 108 and 110 arrays the obtained results in the order in which they seem to be more correct answers. It sends the arrayed results back to the handwritten character recognition controller 1105.

Figure 12A:
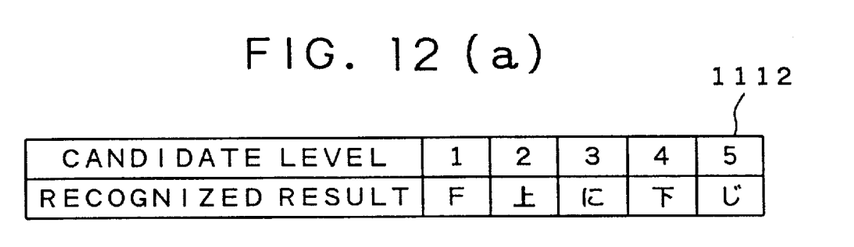
FIGS. 12(a), 12(b) and 12(c) are diagrams for explaining outputs from the handwritten recognition systems shown in FIGS. 10 and 11j and FIGS. 13a, 13b, 13c, and 13d are diagrams explaining how the display of the screen shown in FIG. 8 has been updated.
Figure 12B:
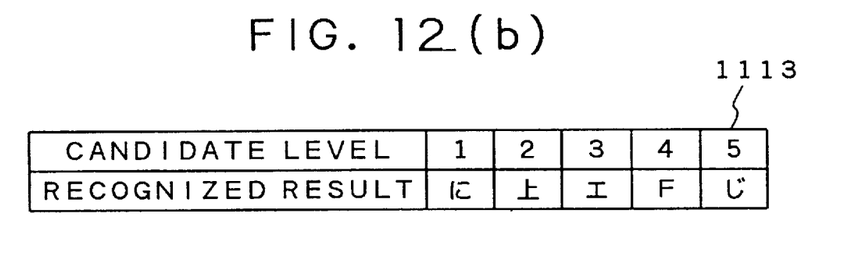
Figure 12C:
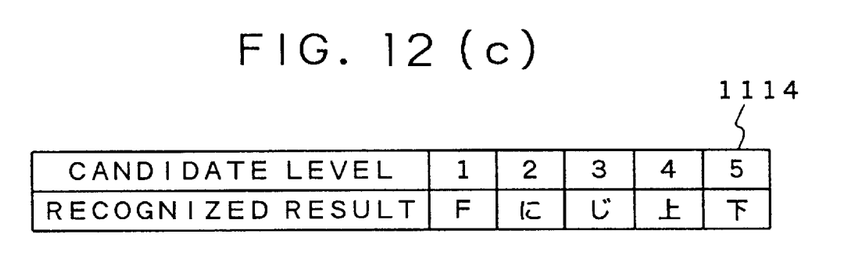

The strings of the characters of the recognized results delivered from the handwritten character recognizers 106, 108 and 110 are respectively stored in individual-recognizer result tables 1112, 1113 and 1114 which are included in the handwritten character recognition controller 1105. The individual-recognizer result table 1112 is an area for storing the recognized results of the handwritten character recognizer 106 therein. Likewise, the individual-recognizer result table 1113 is an area for storing the results of the handwritten character recognizer 108 therein, while the individual-recognizer result table 1114 is an area for storing the results of the handwritten character recognizer 110 therein. FIGS. 12(a), 12(b) and 12(c) illustrate examples of the contents of the individual-recognizer result tables 1112, 1113 and 1114, respectively. The first row of each of the individual-recognizer result tables 1112, 1113 and 1114 indicates the candidate levels. Herein, the candidate levels are smaller as the distance values of the results with respect to the input data are smaller. That is, the result of the smallest distance value is at Level-1, and that of the fifth smaller distance value is at Level-5. The second row of each of the tables 1112, 1113 and 1114 indicates the recognized results which are the candidate characters sent from the corresponding handwritten character recognizer as arrayed in accordance with the candidate levels.

When the recognized results of all the handwritten character recognizers 106, 108 and 110 have become complete, the handwritten character recognition controller 1105 must pick out the result which seems to be the most correct, from among the plurality of results which might exist, so as to send the picked-out result back to the information processor 104. In order to meet this requisite, the handwritten character recognition controller 1105 selects one of the results by a method as explained below.

In view of the individual-recognizer result tables 1112, 1113 and 1114, the controller 1105 can know the candidate levels of the results produced by each of the handwritten character recognizers 106, 108 and 110. On the basis of the candidate level information, one of the results of the first candidates (candidate Level-1) delivered from all the handwritten character recognizers 106, 108 and 110 is selected by a majority decision. In the example of FIGS. 12(a)–12(c), letter "F" has been afforded as the first candidates by the two recognizers 106 and 110, so that the recognized result "F" is selected and is sent to the information processor 104.

Figure 11:
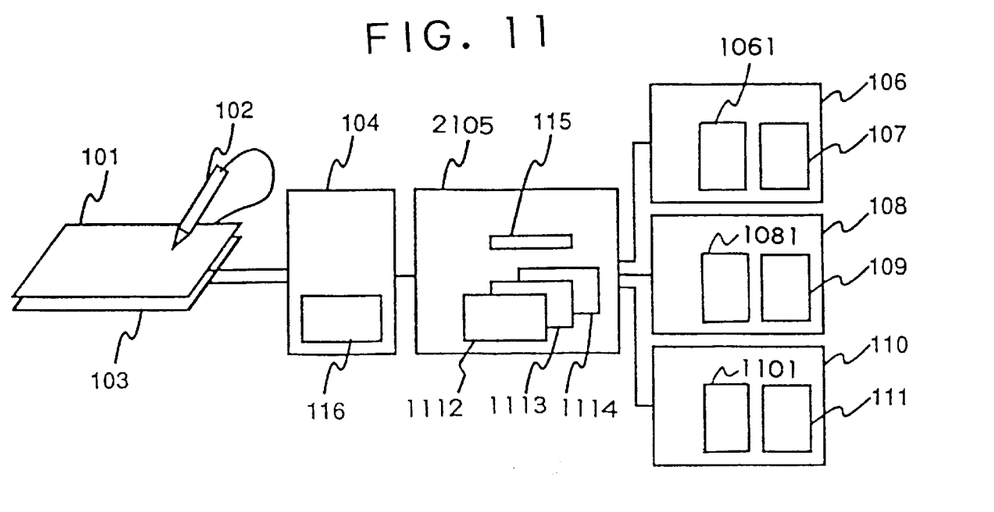
FIG. 11 is a block diagram showing still another embodiment of a document processing system in which one of recognized results is selected in accordance with candidate levels.

Reference will now be made to FIG. 11 to describe an embodiment in which values are given to individual candidate levels, whereupon a character pattern whose summation of the values is the largest value is sent to an information processor (104).

FIG. 11 is a block diagram of the document processing system which utilizes the online handwritten character recognition. This document processing system comprises a coordinate reader 101, a stylus 102 for inputting coordinate values, a display unit 103, an information processor 104, a handwritten character recognition controller 2105, and handwritten character recognizers 106, 108 and 110 which include programs 1061, 1081 and 1101 and dictionaries 107, 109 and 111.

The user of the information processing system can enter a coordinate string into the system with the coordinate reader 101 and the coordinate entering stylus 102. They can enter the coordinate string with the stylus 102 while watching a content displayed on the display unit 103.

The entered coordinate string is immediately sent to the information processor 104. The information processor 104 executes predetermined processes in accordance with particular situations. In a situation where the user enters line drawing information, the information processor 104 successively connects the points of input coordinates with segments.

Also in this embodiment, the operating screen of the document processing system is assumed to be as shown in FIG. 2. A document reading such as "犬も歩けば棒" is displayed. A cursor 205 indicates a position into which the next character is to be inserted.

Character input areas 202 and 203 are areas for entering handwritten characters, and the user writes the characters therein with the stylus 102.

In the state of FIG. 2, the user has handwritten hiragana (Japanese cursive syllabic character) "に" in the character input area 202. Upon detecting that the user's character input operation has been completed, the information processor 104 sends the input coordinate string recorded beforehand, to the handwritten character recognition controller 2105.

A plurality of handwritten character recognizers, the algorithms (programs) or dictionaries of which are different, are connected to the handwritten character recognition controller 2105. In this embodiment, the three handwritten character recognizers 106, 108 and 110 are connected. The handwritten character recognition controller 2105 normalizes the input coordinate string received from the information processor 104, in order that the handwritten character recognizers 106, 108 and 110 may accept the input coordinate string. Subsequently, the controller 2105 sends the normalized coordinate strings to the respective recognizers 106, 108 and 110. The normalized data are sent to the respective handwritten character recognizers 106, 108 and 110.

Here, the contents of the recognition process will be explained for the case of the handwritten character recognizer 106.

The handwritten character recognizer 106 has the dictionary 107 for recognizing handwritten characters. The dictionary 107 contains pairs of character codes and character patterns put together.

The handwritten character recognizer 106 collates the input data with the patterns in the dictionary 107, to thereby estimate a character whose pattern is close to the input data. A method for the collation consists in computing the geometrical distances between the input data and the data in the dictionary 107, and determining the character of the smallest distance value as a recognized result. Such a geometrical distance shall be simply called the "distance" hereinbelow. On account of ambiguity involved in the handwritten character, a plurality of character codes are sometimes obtained as results. It can be surmised that the obtained results will be more correct in the order of shorter distances.

A variety of algorithms for the collation have been contrived on the basis of differences in a method of limiting a collating range, a method of processing the running hand, a method of processing the wrong order of making strokes in writing a character, feature values contained in character patterns in a dictionary, and so forth. Also the handwritten character recognizers 108 and 110 produce recognized results which might differ from each other, in accordance with the respective algorithms (programs 1081, 1101) and dictionaries 109, 111.

Each of the handwritten character recognizers 106, 108 and 110 arrays the obtained results in the order in which they seem to be more correct answers. It sends the arrayed results back to the handwritten character recognition controller 2105.

The character strings of the recognized results delivered from the handwritten character recognizers 106, 108 and 110 are respectively stored in individual-recognizer result tables 1112, 1113 and 1114 which are included in the handwritten character recognition controller 2105. The individual-recognizer result table 1112 is an area for storing the recognized results of the handwritten character recognizer 106 therein. Likewise, the individual-recognizer result table 1113 is an area for storing the results of the handwritten character recognizer 108 therein, while the individual-recognizer result table 1114 is an area for storing the results of the handwritten character recognizer 110 therein. FIGS. 12(*a*), 12(*b*) and 12(*c*) illustrate examples of the contents of the individual-recognizer result tables 1112, 1113 and 1114, respectively. The first row of each of the individual-recognizer result tables 1112, 1113 and 1114 indicates the candidate levels. Herein, the candidate levels are smaller as the distance values of the results with respect to the input data are smaller. That is, the result of the smallest distance value is at Level-1, and that of the fifth smaller distance value is at Level-5. The second row of each of the tables 1112, 1113 and 1114 indicates the recognized results which are the candidate characters sent from the corresponding handwritten character recognizer as arrayed in accordance with the candidate levels.

When the recognized results of all the handwritten character recognizers 106, 108 and 110 have become complete, the handwritten character recognition controller 2105 must pick out the result which seems to be the most correct, from among the plurality of results which might exist, so as to send the picked-out result back to the information processor 104. In order to meet this requisite, the handwritten character recognition controller 2105 selects one of the results by a method as explained below.

In view of the individual-recognizer result tables 1112, 1113 and 1114, the controller 2105 can know the candidate levels of the results produced by each of the handwritten character recognizers 106, 108 and 110. There will now be explained an example of a method of calculating the summations of the candidate levels for the respective recognized results on the basis of the candidate level information.

First, values are given to the individual recognized results as follows by way of example: a value of 1 (one) is given to the correct answer of the first candidate (candidate Level-1), 0.8 to that of the second candidate (Level-2), 0.5 to that of the third candidate (Level-3), and 0.2 to that of any of succeeding candidates (Level-4, et seq.). Besides, 0 (zero) is given to any recognized result which has failed to become a candidate. Subsequently, the total of the values of the recognized results of each recognizer 106, 108 or 110 is divided by the number of times which the recognized results have been obtained. A value of 0 thru 1 inclusive thus calculated is defined as the summation of each of the candidates.

By way-of example, let's consider a case where the individual-recognizer result tables 1112, 1113 and 1114 have the contents shown in FIGS. 12(*a*), 12(*b*) and 12(*c*), respectively.

The character whose summation thus evaluated is the largest is adopted as the recognized result which seems to be the most correct answer.

On the basis of the above values of the candidates, the total values of individual characters in the dictionaries are computed by the use of the character codes. Further, the totals are divided by the number of the recognizing operations. Then, "に" (Japanese cursive syllabic character) has a summation value of 0.77, letter "F" has a summation value of 0.73, "上" (Chinese character used in Japanese writing) has a summation value of 0.6, "じ" (Japanese cursive syllabic character) has a summation value of 0.3, "エ" (Japanese square syllabic character) has a summation value of 0.17, and "下" (Chinese character used in Japanese writing) has a summation value of 0.13. In this case, accordingly, the handwritten character recognition controller 2105 can estimate that the character "に" will be the most correct.

The handwritten character recognition controller 2105 sends the obtained result to the information processor 104.

The information processor 104 operates to display the result sent from the handwritten character recognition controller 105, in the document display area 201 of the display unit 103. In the example mentioned above, the character "に" seems to be the most certain, and hence, the content of the document display area 201 is updated as shown in FIG. 6.

Meanwhile, the displayed-document is sometimes different from a document intended by the user, on account of the ambiguity of a handwritten character. In the illustration of FIG. 6, although the user has intended to enter a document "犬も歩けば棒に", the document "犬も歩けば棒に" is displayed on the screen. In order to correct the error, the user points to the misrecognized character "ば" (Japanese cursive syllabic character) with the stylus 102. The information processor 104 finds that the user has pointed to the character already displayed. Therefore, it may hold the results obtained at in the recognizing operations and may operate to display the results in the candidate character display area 204 of the display unit 103 in order that the user may be permitted to correct the misrecognition. If the intended character is included in the display of the candidate character display area 204, the user can correct the misrecognized character in the document display area 201 by pointing to it with the stylus 102.

The document processing system need not always have the combinations between the plurality of recognizing algorithms and the plurality of dictionaries, but it may well be constructed so as to have a single recognizing algorithm and a plurality of dictionaries (dictionaries algorithm and a plurality of dictionaries (dictionaries whose character patterns are in different calligraphic styles, or ones whose character patterns have their strokes made in different orders). With this construction, a correct answer may well be found in such a way that the values of the function P(i) as in the foregoing embodiment are obtained using only degree of correctness values which are set for respective levels in recognized results based on the dictionaries, that the values of each of the characters are totaled, and that the character of the largest value is estimated to be the correct answer.

Figure 13:
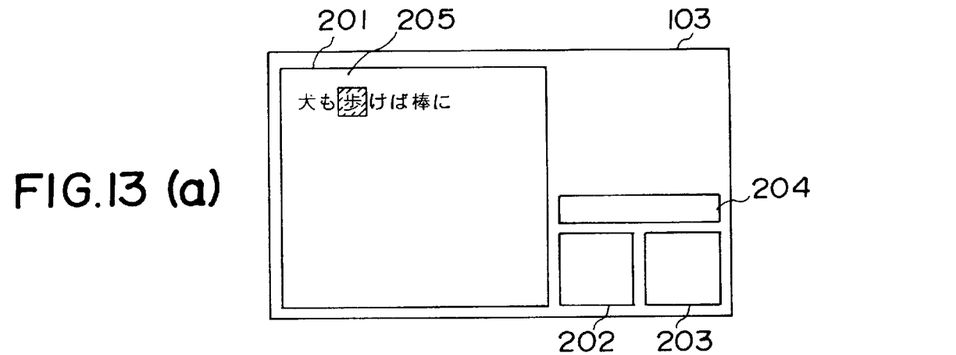

Now, an example of entering a character into the middle of a text will be described with reference to FIG. 13. FIG. 13(a) illustrates a screen before a user starts to write a character. When the user starts to write the first stroke of a character in the character input area 202, a symbol or a character is inserted instead of the result of recognition. In FIG. 13(b), a symbol " " is inserted, for example. That place is indicated by cursor 205. Then FIG. 13(c) illustates the screen immediatly after the user finished writing the character. At the time of this, because the document processing system can not detect the completion of the character, it does not start the recognition of the character. But the position to which the result of the recognition is to be inserted is being kept on the screen, so that the user can perform the editing operations relating to the location. For example, if the position to which is to be inserted the result of the recognition is located at the head or the end of an area which is selected, the user can indicate the position to be included in or excluded from the area because the position which is to be inserted the result of the recognition is visual. As shown in FIG. 13(d), when the result is obtained, the symbol is replaced by the result of recognition.

What is claimed is:

1. A pattern recognition system comprising:
    input means for accepting a handwritten pattern;
    a plurality of recognizers each providing at least one candidate corresponding to said handwritten pattern, said plurality of recognizers thereby providing a plurality of candidates for said handwritten pattern; and
    a recognition controller including:
        calculation means for giving each of said plurality of recognizers a value indicating reliability of each of said plurality of recognizers based on previous recognition results including recognition results changed by user,
        recognition means for selecting one of said plurality of candidates as a recognition result based on the value indicating reliability given to each of said plurality of said recognizers, and
        correction means for accepting, from a user, a correction for said recognition result and changing said recognition result in accordance with said correction.

2. A pattern recognition system as defined in claim 1, wherein each of said recognizers comprises a dictionary for pattern recognition, the dictionary of each of said recognizers providing a different type of pattern recognition.

3. A pattern recognition system as defined in claim 1, wherein each of said recognizers comprises a program for pattern recognition, the program of each of said recognizers providing a different type of pattern recognition.

4. A pattern recognition system as defined in claim 1, wherein a candidate is a character.

5. A pattern recognition system as defined in claim 1, wherein said recognition means includes means for assigning a value to each of the at least one candidate provided by each of said plurality of recognizers for a given inputted handwritten pattern, said value being based on the value indicating reliability of the recognizer which provided that candidate, and means for selecting a candidate which has the highest sum of values in all of the pluralities of candidates for the given inputted handwritten pattern as said recognition result.

6. A pattern recognition method comprising:
    an accepting step for accepting a handwritten pattern;
    a recognizing step wherein each of a plurality of recognizers selects at least one candidate according to said handwritten pattern to thereby form a plurality of candidates;
    a calculating step for giving each of said plurality of recognizers a value indicating reliability of each of said plurality of recognizers based on previous recognition results including recognition results changed by a user;
    a selecting step for selecting one of said plurality of candidates as a recognition result based on the value indicating reliability given to each of said plurality of recognizers; and
    a correcting step for accepting, from a user, a correction for said recognition result and changing said recognition result in accordance with said correction.

7. A pattern recognition system comprising:
    input means for accepting handwritten patterns;
    a plurality of recognizers each providing a plurality of candidates corresponding to each of said handwritten patterns; and
    a recognition controller including:
        first storage means for storing the plurality of candidates provided by each recognizer for each of said handwritten patterns,
        second storage means for storing a candidate, selected from said first storage means, for each of said handwritten patterns, as a correct candidate and storing a candidate corrected by a user as said correct candidate when the candidate is corrected by said user,
        recognizer performance assessing means for assigning to each recognizer, each time a handwritten pattern is inputted to said recognizers by said input means, a current value indicating reliability of the recognizer based on at least some of the correct candidates stored in said second storage means, said pluralities of candidates provided by said recognizers for each of the inputted handwritten patterns corresponding to the correct candidates as stored in said first storage means, and candidates corrected by said user stored as correct candidates in said second storage means,
        candidate assessing means for assigning to each candidate, within each plurality of candidates provided by each recognizer, a value based on the current valve indicating reliability assigned to the recognizer which provided that candidate,
        recognition means for selecting a candidate from the respective pluralities of candidates stored in said first storage means for a given inputted handwritten pattern based on the values indicating reliability assigned to the candidates by said candidate assessing means and for storing the selected candidate as a correct candidate in said second storage means, and correction means for accepting, from a user, a user correction for correcting a candidate selected by said recognition means, changing said candidate in accordance with said user correction, and storing the candidate corrected by the user in said second storage means as a correct candidate.

8. A pattern recognition system as defined in claim 7, wherein each of said recognizers comprises a dictionary for pattern recognition, the dictionary of each of said recognizers providing a different type of pattern recognition.

9. A pattern recognition system as defined in claim 7, wherein each of said recognizers comprises a program for pattern recognition, the program of each of said recognizers providing a different type of pattern recognition.

* * * * *